US009628803B2

(12) United States Patent
He

(10) Patent No.: US 9,628,803 B2
(45) Date of Patent: Apr. 18, 2017

(54) PERCEPTUAL IMAGE AND VIDEO CODING

(71) Applicant: BlackBerry Limited, Waterloo (CA)

(72) Inventor: Dake He, Waterloo (CA)

(73) Assignee: BlackBerry Limited, Waterloo (CA)

( * ) Notice: Subject to any disclaimer, the term of this patent is extended or adjusted under 35 U.S.C. 154(b) by 378 days.

(21) Appl. No.: 14/552,590

(22) Filed: Nov. 25, 2014

(65) Prior Publication Data

US 2016/0150230 A1  May 26, 2016

(51) Int. Cl.
| | |
|---|---|
| *H04N 19/124* | (2014.01) |
| *H04N 19/60* | (2014.01) |
| *H04N 19/154* | (2014.01) |
| *H04N 19/147* | (2014.01) |
| *H04N 19/44* | (2014.01) |
| *H04N 19/61* | (2014.01) |
| *H04N 19/105* | (2014.01) |
| *H04N 19/176* | (2014.01) |

(52) U.S. Cl.
CPC ........ *H04N 19/124* (2014.11); *H04N 19/105* (2014.11); *H04N 19/147* (2014.11); *H04N 19/154* (2014.11); *H04N 19/176* (2014.11); *H04N 19/44* (2014.11); *H04N 19/60* (2014.11); *H04N 19/61* (2014.11)

(58) Field of Classification Search
CPC .... H04N 19/124; H04N 19/60; H04N 19/154; H04N 19/147
See application file for complete search history.

(56) References Cited

U.S. PATENT DOCUMENTS

| 5,113,256 A | 5/1992 | Citta et al. |
|---|---|---|
| 8,326,067 B2 | 12/2012 | Furbeck |
| 2014/0140396 A1* | 5/2014 | Wang ................. H04N 19/61 375/240.03 |

OTHER PUBLICATIONS

G. Bjontegaard, "Calculation of average PSNR differences between RD-curves," VCEG-M33, 13th VCEG Meeting, Austin, TX, USA, Apr. 2001.
Z. Wang, A. C. Bovik, H. R. Sheikh, and E. P. Simoncelli, "Image quality assessment: From error visibility to structural similarity," IEEE Trans. Image Proc., vol. 13, pp. 600-612, Apr. 2004.
D.-K. He and J. Wang, "On rate distortion optimized quantization based on weighted mean squared error for lossy image coding," accepted for presentation at ICIP 2014.
(Continued)

*Primary Examiner* — Nam Pham
(74) *Attorney, Agent, or Firm* — Rowand LLP

(57) ABSTRACT

Methods and devices for perceptual image and video coding. A method for reconstructing a quantization parameter for a current block includes predicting the quantization parameter, wherein predicting the quantization parameter is based upon a previous quantization parameter used for a neighboring block in the image, an estimated AC energy of the neighboring block, and an estimated AC energy of the current block; decoding from the bitstream a quantization parameter residual; and deriving the quantization parameter from the predicted quantization parameter and the quantization parameter residual. The method may include reconstructing the pixels of the current block, including dequantizing decoded quantized transform domain coefficients based on the quantization parameter.

20 Claims, 6 Drawing Sheets

(56) References Cited

OTHER PUBLICATIONS

S. Wang, A. Rehman, Z. Wang, S. Ma, and W. Gao, "SSIM-Motivated Rate-Distortion Optimization for Video Coding," IEEE Trans. Circuit and Systems for Video Technology, vol. 22, 2012.
C. Yeo, H. L. Tan, and Y. H. Tan, "On Rate Distortion Optimization Using SSIM," IEEE Trans. Circuit and Systems for Video Technology, vol. 23, 2013.
EPO, Extended European Search Report relating to EP Application No. 15193682.0, dated Feb. 16, 2016.
Sargar et al.: "Macroblock level QP adaptation using SSIM for H.264 Encoder", International Journal of Advanced Research in Computer Engineering & Technology, XP002752632, retrieved on Dec. 21, 2015.
Channappayya et al.: "Rate Bounds on SSIM Index of Quantized Image DCT Coefficients", Data Compression Conference, Mar. 25, 2008, XP031241192.

* cited by examiner

PERCEPTUAL IMAGE AND VIDEO CODING

FIELD

The present application generally relates to data compression and, in particular, to methods and devices for perceptual image and video coding.

BACKGROUND

Data compression is used in communications and computer networking to store, transmit, and reproduce information efficiently. It finds particular application in the encoding of images, audio and video. Common image compression formats include JPEG, TIFF, and PNG. An image compression standard proposed by Google™ is WebP. A popular video coding standard has been the ITU-T H.264/AVC video coding standard. It defines a number of different profiles for different applications, including the Main profile, Baseline profile and others. A newly-developed video coding standard is the ITU-T H.265/HEVC standard. Other standards include VP-8, VP-9, AVS, and AVS-2.

All of these image and video coding standards operate by partitioning and image/picture into blocks (in some cases, a hierarchy of blocks and subblocks, like the coding tree blocks (CTB) of HEVC). A block is predicted and the difference (residual) between the prediction and the actual pixel data of the block is then transformed, quantized and entropy encoded. The quantization of transform domain coefficients introduces distortion that reduced the reconstructed picture quality at the decoder. Many of these processes use some type of rate-distortion optimization routine to select coding parameters based upon trade-offs between transmission rate and distortion.

The human visual system does not have the same sensitivity to all distortion. For example, humans are more sensitive to distortion in lower frequency components than to distortion in higher frequency components. The measure of distortion most commonly used is peak signal-to-noise ratio (PSNR), which measures the mean squared error (MSE) between spatial domain pixels in the reconstructed picture versus the original picture. However, this is not necessarily an accurate representation of human sensitivity to distortion.

Work on human perception of image and video distortion has led to the development of various measurements of "structural similarity" (SSIM) between an original picture and its reconstruction, which may be a better representation of human perception of error than PSNR. A structural similarity metric may take into account the mean values of the two pictures (or a window or block of pixels), the variance within each of those pictures/blocks and the covariance of those two pictures/blocks. SSIM may, therefore, be useful in making coding decisions, including the level of quantization to apply to a particular set of pixel data. However, actual structural similarity metrics are complex to calculate and, in the case of quantization, may require multiple passes to avoid an exhaustive search because there is no straightforward way to decompose the SSIM calculation into more simple sub-problems. This may introduce unacceptable delay and/or computational burden.

BRIEF DESCRIPTION OF THE DRAWINGS

Reference will now be made, by way of example, to the accompanying drawings which show example embodiments of the present application, and in which.

Similar reference numerals may have been used in different figures to denote similar components.

DESCRIPTION OF EXAMPLE EMBODIMENTS

Figure 1:
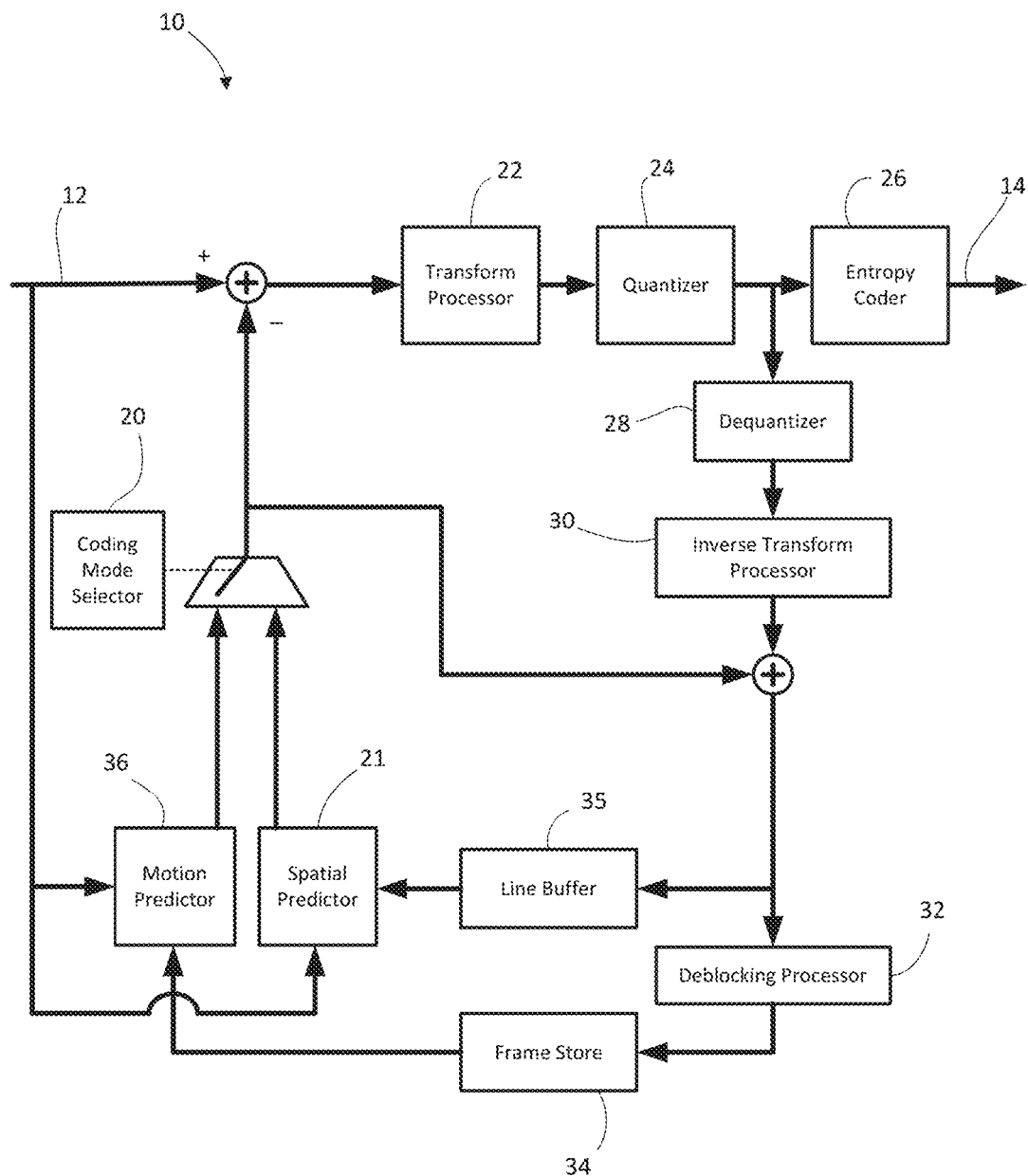
FIG. 1 shows, in block diagram form, an encoder for encoding video.

The present application describes methods and encoders/decoders for encoding and decoding images and/or video.

In a first aspect, the present application describes encoding and decoding processes that employ perceptual quality measurements in the assessment of distortion and, thus, in the determination or selection of certain coding parameters. In one aspect, the perceptual quality measurement is wholly or partly based upon a determination of AC energy. AC energy may be determined in the spatial domain or in the transform domain, in some implementations.

In one aspect, the present application discloses modified distortion weighting factors based on AC energy determinations.

In another aspect, the present application describes the adjustment of an average or default quantization step size for a group of blocks based on the AC energy of a selection of the blocks in the group to create a modified quantization step size for use in quantizing or dequantizing coefficients of the selection of blocks. The selection of blocks may, in one example, be a percentage of the blocks. In one case, the percentage selected are those with an AC energy higher than a threshold.

In a further aspect, the present application describes the segmentation of a picture or slice on the basis of AC energy, such that segments contain blocks (e.g. macroblocks) that have similar AC energy, where segments have segment-specific quantization parameters.

In yet a further aspect, the present application describes a process for selection of partition mode in image or video coding in which the distortion in a rate-distortion expression is modified by a weighting factor that is partly based upon the AC energy of a block under consideration.

In yet another aspect, the present application describes a method of decoding an image from a bitstream of encoded data using a decoder, the image being partitioned into blocks. The method includes, for a current block of the image, determining a predicted value of a quantization parameter to be used in decoding the current block, wherein the predicted value is based upon a previous quantization parameter used for a neighboring block in the image, an estimated AC energy of the neighboring block, and an estimated AC energy of the current block. The method further includes decoding from the bitstream a quantization parameter residual and deriving the quantization parameter from the predicted value and the quantization parameter residual; and reconstructing the pixels of the block, including dequantizing decoded quantized transform domain coefficients based on the quantization parameter.

In a further aspect, the present application describes encoders and decoders configured to implement such methods of encoding and decoding.

In yet a further aspect, the present application describes non-transitory computer-readable media storing computer-executable program instructions which, when executed, configured a processor to perform the described methods of encoding and/or decoding.

Other aspects and features of the present application will be understood by those of ordinary skill in the art from a review of the following description of examples in conjunction with the accompanying figures.

It will be understood that may aspect of the present application are not limited to either image or video coding and may be applied to image and video coding in some embodiments.

In the description that follows, some example embodiments are described with reference to the H.264/AVC standard for video coding and/or the H.265/HEVC standard. Those ordinarily skilled in the art will understand that the present application is not limited to H.264/AVC or H.265/HEVC but may be applicable to other video coding/decoding standards, including possible future standards, multi-view coding standards, scalable video coding standards, 3D video coding standards, and reconfigurable video coding standards. Similarly, to the extent that reference is made to particular image coding standards, like JPEG or WebP, it will be appreciated that the processes and devices described may be implemented in connection with other standards, including future standards In the description that follows, when referring to video or images the terms frame, picture, slice, tile, quantization group, and rectangular slice group may be used somewhat interchangeably. Those of skill in the art will appreciate that a picture or frame may contain one or more slices or segments. A series of frames/pictures may be called a "sequence" in some cases. Other terms may be used in other video or image coding standards. It will also be appreciated that certain encoding/decoding operations might be performed on a frame-by-frame basis, some are performed on a slice-by-slice basis, some picture-by-picture, some tile-by-tile, and some by rectangular slice group, etc., depending on the particular requirements or terminology of the applicable image or video coding standard. In any particular embodiment, the applicable image or video coding standard may determine whether the operations described below are performed in connection with frames and/or slices and/or pictures and/or tiles and/or rectangular slice groups, etc., as the case may be. Accordingly, those ordinarily skilled in the art will understand, in light of the present disclosure, whether particular operations or processes described herein and particular references to frames, slices, pictures, tiles, rectangular slice groups are applicable to frames, slices, pictures, tiles, rectangular slice groups, or some or all of those for a given embodiment. This also applies to coding tree units, coding units, prediction units, transform units, quantization groups, etc., as will become apparent in light of the description below.

Figure 2:
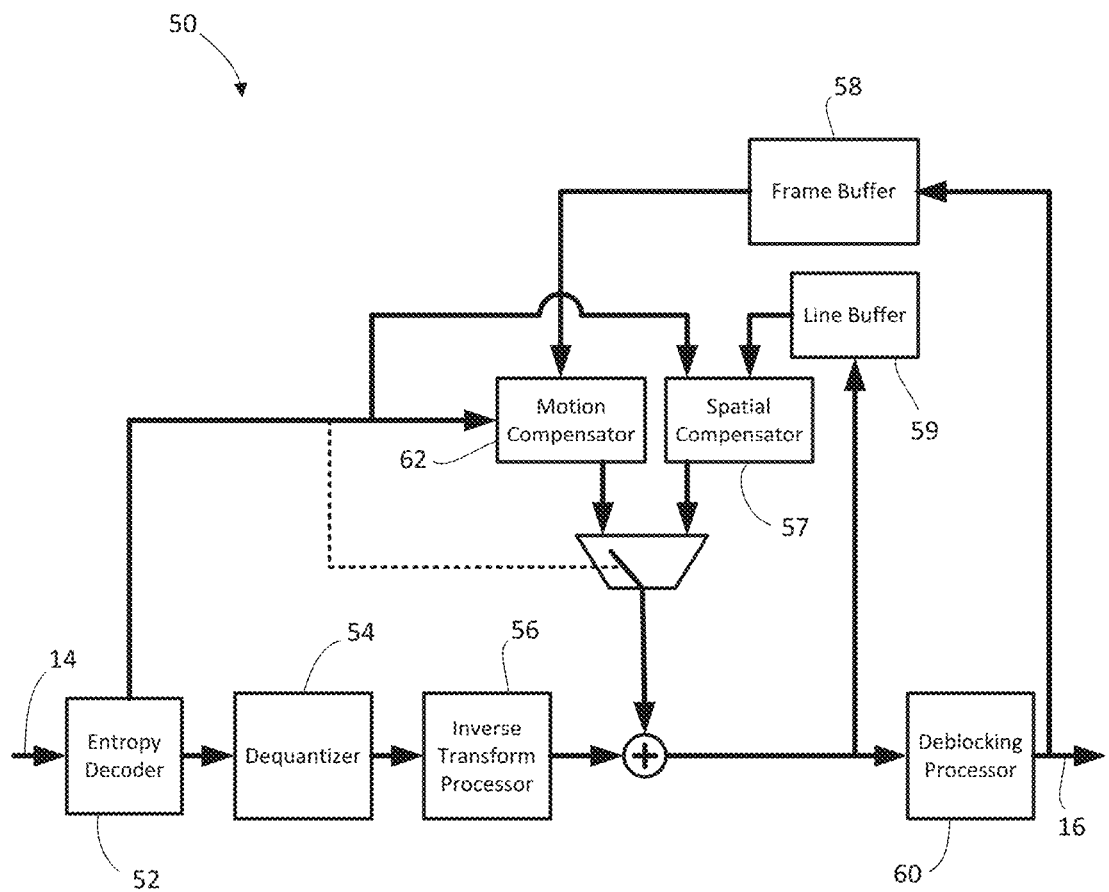
FIG. 2 shows, in block diagram form, a decoder for decoding video.

Reference is now made to FIG. 1, which shows, in block diagram form, an encoder 10 for encoding video. Reference is also made to FIG. 2, which shows a block diagram of a decoder 50 for decoding video. It will be appreciated that the encoder 10 and decoder 50 described herein may each be implemented on an application-specific or general purpose computing device, containing one or more processing elements and memory. The operations performed by the encoder 10 or decoder 50, as the case may be, may be implemented by way of application-specific integrated circuit, for example, or by way of stored program instructions executable by a general purpose processor. The device may include additional software, including, for example, an operating system for controlling basic device functions. The range of devices and platforms within which the encoder 10 or decoder 50 may be implemented will be appreciated by those ordinarily skilled in the art having regard to the following description.

The encoder 10 receives a video source 12 and produces an encoded bitstream 14. The decoder 50 receives the encoded bitstream 14 and outputs a decoded video frame 16. The encoder 10 and decoder 50 may be configured to operate in conformance with a number of video compression standards.

The encoder 10 includes a spatial predictor 21, a coding mode selector 20, transform processor 22, quantizer 24, and entropy encoder 26. As will be appreciated by those ordinarily skilled in the art, the coding mode selector 20 determines the appropriate coding mode for the video source, for example whether the subject frame/slice is of I, P, or B type, and whether particular coding units within the frame/slice are inter or intra coded. The transform processor 22 performs a transform upon the spatial domain data. In particular, the transform processor 22 applies a block-based transform to convert spatial domain data to spectral components. For example, in many embodiments a discrete cosine transform (DCT) is used. Other transforms, such as a discrete sine transform, a wavelet transform, or others may be used in some instances. The block-based transform is performed on a transform unit. The transform unit may be the size of the coding unit, or the coding unit may be divided into multiple transform units. In some cases, the transform unit may be non-square, e.g. a non-square quadrature transform (NSQT).

Applying the block-based transform to a block of pixel data results in a set of transform domain coefficients. A "set" in this context is an ordered set in which the coefficients have coefficient positions. In some instances the set of transform domain coefficients may be considered as a "block" or matrix of coefficients. In the description herein the phrases a "set of transform domain coefficients" or a "block of transform domain coefficients" are used interchangeably and are meant to indicate an ordered set of transform domain coefficients.

The set of transform domain coefficients is quantized by the quantizer 24. The quantized coefficients and associated information are then encoded by the entropy encoder 26.

Intra-coded frames/slices (i.e. type I) are encoded without reference to other frames/slices. In other words, they do not employ temporal prediction. However intra-coded frames do rely upon spatial prediction within the frame/slice, as illustrated in FIG. 1 by the spatial predictor 21. That is, when encoding a particular block the data in the block may be compared to the data of nearby pixels within blocks already encoded for that frame/slice. Using a prediction operation, the encoder creates a predicted block or unit based on the data of nearby pixels. There are various modes or directions for prediction. In some cases rate-distortion optimization may be used to select a mode/direction. The nearby pixels used in the prediction operation are reconstructed pixels that have been previously encoded and decoded and stored in a line buffer 35 within the feedback loop. The difference between the actual pixel data for the block and the predicted block is a residual block, i.e. an error signal. The residual data is transformed, quantized and encoded for transmission in the bitstream 14.

Inter-coded frames/blocks rely upon temporal prediction, i.e. they are predicted using reconstructed data from other frames/pictures. The encoder 10 has a feedback loop that includes a de-quantizer 28, inverse transform processor 30, and deblocking processor 32. The deblocking processor 32 may include a deblocking processor and a filtering processor. These elements mirror the decoding process implemented by the decoder 50 to reproduce the frame/slice. A frame store 34 is used to store the reproduced frames. In this manner, the motion prediction is based on what will be the reconstructed frames at the decoder 50 and not on the original frames, which may differ from the reconstructed frames due to the lossy compression involved in encoding/decoding. A motion predictor 36 uses the frames/slices stored in the frame store 34 as source frames/slices for comparison to a current frame for the purpose of identifying similar blocks. In other words, a motion vector search is carried out to identify a block within another frame/picture. That block is the source of the predicted block or unit. The difference between the predicted block and the original block becomes the residual data that is then transformed, quantized and encoded.

Those ordinarily skilled in the art will appreciate the details and possible variations for implementing video encoders.

The decoder 50 includes an entropy decoder 52, dequantizer 54, inverse transform processor 56, and deblocking processor 60. The deblocking processor 60 may include deblocking and filtering processors. A line buffer 59 stores reconstructed pixel data while a frame/picture is being decoded for use by a spatial compensator 57 in intra-coding. A frame buffer 58 stores fully-reconstructed and deblocked frames for use by a motion compensator 62 in applying motion compensation.

The bitstream 14 is received and decoded by the entropy decoder 52 to recover the quantized coefficients. Side information may also be recovered during the entropy decoding process, including coding mode information, some of which may be supplied to the feedback loop for use in creating the predictions. For example, the entropy decoder 52 may recover motion vectors and/or reference frame information for inter-coded blocks, or intra-coding mode direction information for the intra-coded blocks.

The quantized coefficients are then dequantized by the dequantizer 54 to produce the transform domain coefficients, which are then subjected to an inverse transform by the inverse transform processor 56 to recreate/reconstruct the residual pixel-domain data. The spatial compensator 57 generates the video data from the residual data and a predicted block that it creates using spatial prediction. The spatial prediction applies the same prediction mode/direction as was used by the encoder in reliance upon previously-reconstructed pixel data from the same frame. Inter-coded blocks are reconstructed by creating the predicted block based on a previously-decoded frame/picture and the motion vector decoded from the bitstream. The reconstructed residual data is then added to the predicted block to generate the reconstructed pixel data. Both spatial and motion compensation may be referred to herein as "prediction operations".

A deblocking/filtering process may then be applied to a reconstructed frame/slice, as indicated by the deblocking processor 60. After deblocking/filtering, the frame/slice is output as the decoded video frame 16, for example for display on a display device. It will be understood that the video playback machine, such as a computer, set-top box, DVD or Blu-Ray player, and/or mobile handheld device, may buffer decoded frames in a memory prior to display on an output device.

Distortion arises because quantization of the transformed residual results in data loss. Quantization, in general, is the mapping of a range of data values to a reduced range of values. In some coding schemes, a parameter, like the quantization parameter QP, is selected for a sequence, picture, frame, slice, quantization group, block, etc. and all values are quantized using the quantization step size corresponding to that parameter. In some other coding schemes, the quantization parameter may vary depending on the coefficient position in a transform block, e.g. in frequency-dependent quantization (FDQ). In FDQ, the quantization steps size depends on the frequency associated with the transform domain coefficient, i.e. on its position within the block of transform domain coefficients. FDQ may be implemented using a fixed matrix of quantization steps sizes corresponding in size to the block being quantized.

In many cases, distortion is measured by comparing the original pixels to the reconstructed pixels. For example, distortion may be measured using peak signal-to-noise ratio (PSNR), which is based on the mean-squared error between the original and reconstructed pixels. While PSNR is straightforward to calculate, it does not accurately model the human visual system's perception of quality.

Alternative measurements of distortion that more closely model human visual perception have been developed, such as structural similarity (SSIM) measurements. In the spatial domain, the SSIM between an image x and its reconstruction y may be given by:

$$SSIM(x, y) = \left(1 - \frac{(\mu_x - \mu_y)^2}{(\mu_x^2 + \mu_y^2 + C_1)}\right)$$
$$\left(1 - \frac{\|(x - \mu_x) - (y - \mu_y)\|^2}{\|x - \mu_x\|^2 + \|y - \mu_y\|^2 + (n-1)C_2}\right)$$

In this expression, $\mu_x$ is the mean of x, $\mu_y$ is the mean of y, $\|.\|$ denotes the L2 norm, and $C_1$ and $C_2$ are constants that are used to avoid instability when the denominators are close to zero. For brevity, we use (v−a), where $v=(v_0, v_1, \ldots, v_{k-1})$ is a length-k vector, k>1, and a is a scalar, so as to denote the vector $(v_0-a, v_1-a, \ldots, v_{k-1}-a)$. Notably, the SSIM function takes vectors as inputs and cannot be factored into simple functions with scalar inputs, which implies that dynamic programming might not be possible in solving problems based on SSIM in a cost function, i.e. for making coding decisions in an image or video encoder or decoder.

In order to address the computational complexity associated with using the above expression for SSIM in practical image/video coding, but to still incorporate statistical measurements that reflect perceptual quality, one can modify the traditional mean squared error (MSE) measurement to create a weighted mean squared error (WMSE) measurement. For example, one expression of WMSE proposes a two-tuple metric ($w_{dc}$, $w_{ac}$) that measures the WMSE for the DC coefficients and the AC coefficients separately. Example expressions are:

$$w_{dc}(x, y) = \frac{(\mu_x - \mu_y)^2}{2\mu_x^2 + C_1}$$

$$w_{ac}(x, y) = \frac{\|(x - \mu_x) - (y - \mu_y)\|^2}{2\|x - \mu_x\|^2 + (n-1)C_2}$$

These quantities may be used, for example, in a JPEG encoding scheme. Within the rate-distortion-optimized quantization (RDOQ) process, a greedy search may be used to find the quantization output u for an 8×8 image block x after DCT. In the notation below, $y=y_0 \ldots y_{63}$ is a length 64 sequence of DCT coefficients of DCT(x) following the zig-zag scanning order. Then the RDOQ tries to solve the following minimization problem:

$$\min_u [r(u) + \lambda_{dc} w_{dc}(x,\hat{x}) + \lambda_{ac} w_{ac}(x,\hat{x})] =$$

$$\min_u \left[ r(u) + \lambda_{ac} \frac{(y_0 - \hat{y}_0)^2}{2y_0^2 + C_1'} + \lambda_{ac} \frac{\sum_{k=1}^{63}(y_i - \hat{y}_i)^2}{2\sum_{k=1}^{63} y_i^2 + C_2'} \right]$$

In the above-expression, r(u) denotes the number of bits used to encode u by using the JPEG entropy coding method, $\lambda_{dc}$ and $\lambda_{ac}$ are standard Lagrange multipliers, $\hat{y}=\hat{y}_0 \ldots \hat{y}_{63}$ denotes the reconstructed DCT coefficients from u, and $\hat{x}$=IDCT($\hat{y}$) denotes the reconstruction of x in spatial domain. Further, $C_1'$ and $C_2'$ in the above expression are constants that are used to avoid instability when the denominators are close to zero. In some implementation of DCT, $C_1'=64C_1$, and $C_2'=63C_2$. Expressed another way, the rate-distortion cost function for a block i where i=1, ... N, may be stated as:

$$J_i(u_i) = w_{i,ac} d_{i,ac}(u_i,x_i) + w_{i,dc} d_{i,dc}(u_i,x_i) + \lambda r(u_i)$$

In the above, $x_i$ denotes block i, $u_i$ denotes the quantization output in response to, $x_i$, $d_{i,ac}(u_i,x_i)$ denotes the AC distortion, $d_{i,dc}(u_i, x_i)$ denotes the DC distortion, $$w_{i,ac} = \frac{2\overline{\sigma^2} + C_2}{2\sigma_i^2 + C_2}$$

and $$w_{i,dc} = \frac{2\overline{\mu^2} + C_1}{2\mu_i^2 + C_1},$$

where $\sigma_i^2$ denotes the AC energy of $x_i$ normalized against its size, $\overline{\sigma^2}$ denotes the average of $\sigma_i^2$, i.e., $$\overline{\sigma^2} = \frac{1}{N}\sum_{i=1}^{N} \sigma_i^2,$$

$\mu_i^2$ denotes the DC energy of block i, and $\overline{\mu^2}$ denotes the average of $\mu_i^2$, i.e.

$$\overline{\mu^2} = \frac{1}{N}\sum_{i=1}^{N} \mu_i^2,$$

Note that it is also possible to calculate $$\overline{\mu} = \frac{1}{N}\sum_{i=1}^{N} \mu_i,$$

and use $\overline{\mu}^2$ in place of $\overline{\mu^2}$. Similarly, one can compute $$\overline{\sigma} = \frac{1}{N}\sum_{i=1}^{N} \sigma_i,$$

and use $\overline{\sigma}^2$ in place of $\overline{\sigma^2}$.

Suppose that the quantization step size at a DCT position k, k=0, ..., 63, selected by the JPEG encoder is $q_k$. When $w_{i,ac}$ is less than 1, it is equivalent to allowing a larger quantization error at position k (for the same amount of rate cost), which in turn implies an effective quantization step size larger than $q_k$. This is possible in RDOQ by simply examining quantization indices other than the one minimizing the distortion at position k for block i (denoted by $u_{i,k}$ for brevity). However, when $w_{i,ac}$ is greater than 1, it is equivalent to asking for a smaller quantization error at position k than the one afforded by $q_k$. Since $q_k$ defines all the reconstruction levels at k, it is unfortunately impossible to find a smaller quantization error than the one given by $u_{i,k}$. In other words, we will not be able to improve visual quality for block i if $\sigma_i^2$ (or $\mu_i^2$, respectively) is less than $\overline{\sigma^2}$ (or $\overline{\mu^2}$, respectively).

In the description that follows, various methods and devices are described that, like the above process, employ a measurement of (or estimate of) AC energy as a factor in coding decisions. The incorporation of AC energy into some of the below coding methods may help improve visual quality through the incorporation of a perceptual quality measurement into measurements of distortion or other coding decisions.

Modified Distortion Weighting Factors

In one aspect, the present application describes methods and devices for using perceptual weighting in the selection of a quantization step size. In particular, the perceptual weighting may be based upon a portion of blocks in an image, picture, slice, or other multi-block portion of an image.

Using image coding as an example, it will be recalled that JPEG uses the same quantization matrix for all DCT blocks in a picture. Similarly, WebP uses the same quantization steps for a whole segment of a picture.

It may also be noted that the SSIM measurement treats all AC positions equally. For that reason, it may be assumed for present purposes that the same quantization step size q is used for all AC positions in a quantizer. However, if different quantization steps sizes are used, it may be possible to modify the processes described below to account for that variation, for example as discussed in U.S. Pat. No. 8,326,067 to Furbeck, granted Dec. 4, 2012, and incorporated herein by reference. As discussed above, quantization step size q may be selected according to $\overline{\sigma^2}$. Suppose there are M DCT blocks, i.e., i=0, ..., M−1. Assuming that each DCT block may determine its own quantization step size, $q_i$, for the AC coefficients, then for any i, i' in {0, ..., M−1}, the following equality may be targeted:

$$\frac{q_i^2}{\sigma_i^2} = \frac{q_{i'}^2}{\sigma_{i'}^2} = c$$

where c is a constant related to the Lagrange multipliers. In other words, quantization step sizes $q_i$, i=0, ..., M−1, is sought that results in substantially the same slope of the rate-distortion curve of each block. This in turn leads to:

$$\frac{1}{M}\sum_{i=0}^{M-1} q_i^2 = \frac{c}{M}\sum_{i=0}^{M-1} \sigma_i^2 = c\overline{\sigma^2}$$

If $$\overline{q} = \sqrt{\frac{1}{M}\sum_{i=0}^{M-1} q_i^2},$$

then:

$$\frac{\overline{q}^2}{\overline{\sigma^2}} = c$$

Accordingly, if one were to select the quantization step size as q, the quantization step size targets the blocks with the average AC energy and average visual quality. However, in some embodiments, it may be desirable to ensure that the worst-case visual quality score (e.g. the SSIM, or some similar perceptual measurement, of a local region) of a picture is no less than a given quantity, or that the visual quality score of, say a certain percentage, of a picture is no less than a given quantity.

As an example, suppose that t percent, $0 \leq t \leq 1$, of the M blocks have an AC energy higher than $\sigma_t^2$ and (1−t) percent have an AC energy lower than $\sigma_t^2$. In one example, this may be ascertained through ordering the blocks by their respective AC energies and identifying the t percent having the highest AC energy. Then the quantization step size $q_t$, may be selected as:

$$q_t = \overline{q}\frac{\sigma_t^2}{\overline{\sigma^2}}$$

This will result in the t percent blocks with AC energy higher than $\sigma_t^2$ to by reconstructed with a perceptual quality (e.g. SSIM index) higher than that afforded by $(\overline{q}, \overline{\sigma^2})$. Note that $\overline{q}$ indicates the quantization step size selected so as to achieve an average quality. The selection of $\overline{q}$ may be accomplished using a predetermined look-up table, empirical formula, or other preselected association between a quality score (and, optionally, $\overline{\sigma^2}$) and quantization step sizes.

In some other applications, SDQ (soft decision quantization) or its simplified version RDOQ (rate distortion optimized quantization) might not be possible due to the computational complexity involved. In such an application, one can select q such that $q^2$ minimizes the following sum, $$\sum_{i=0}^{M-1}\left(\frac{q^2}{\sigma_i^2} - c\right)^2$$

Straightforward calculation leads to:

$$q^2 = \overline{q}^2 \frac{\sum_{i=0}^{M-1}\frac{1}{\sigma_i^2}}{\sum_{i=0}^{M-1}\frac{\sigma^2}{\sigma_i^4}}$$

AC Energy-Based Segmentation

Some image and video coding processes provide for segmentation or separation of an image or picture into groups of blocks have having its own set of quantization parameters (as opposed to cases where the whole image/picture has the same quantization parameters or cases where each block has its own set of quantization parameters). An example of such a process is the WebP image coding process, which segments an image into up to four segments. Current WebP implementations use a parameter called the "alpha value" of a macroblock as the basis for deriving the segment ID of a macroblock, and thus it serves as the basis for segmenting the image.

In particular, the partition process is a simplified K-means algorithm at the picture level that works on the alpha values of macroblocks. An alpha value is an integer between 0 and 255 roughly indicating how difficult a macroblock is to encode, and is calculated by the following equation:

alpha=(max_value>1)?ALPHA_
        SCALE*last_non_zero/max_value:0;

In the above expression, ALPHA_SCALE=2*255, last_non_zero denotes the largest absolute quantized dct coefficient (using a fixed quantization step size 8 for alpha derivation) in a macroblock, and max_value denotes the largest number of occurrences of a non-zero absolute quantized dct coefficient. The range of last_non_zero is [0, 31]. Both last_non_zero and max_value are derived from a histogram storing the empirical distribution of the absolute quantized dct coefficients in a macroblock. Note that alpha will be eventually clipped to [0, 255].

Contrary to the alpha value approach, the present application proposes to use AC energy of a macroblock as the basis for deriving segment ID, and thus for partitioning an image/picture. For example, consider a 16×16 luminance block in macroblock k. Let $E_{k,i}$, $i=0, \ldots, 15$, denote the average AC energy of the ith 4×4 luminance block in macroblock k. Thus the average AC energy in the macroblock can be calculated as $$E_k = \frac{1}{16}\sum_{i=0}^{15} E_{k,i}.$$

$E_k$ is related to the complexity/activity of the content in macroblock k: a larger $E_k$ typically indicates more complex content and a smaller $E_k$ typically indicates less complex and flatter content.

Using $E_k$ in place of the alpha value, in some embodiments the encoder may use a similar K-means method to derive the segment id of macroblock k in a picture. The resulting segmentation thus groups macroblocks with similar AC energy. Since all macroblocks in a segment are quantized by using the same quantization parameters (e.g. quantization steps), such grouping based on AC energy allows smaller variation in structural similarity introduced by quantization in a segment.

In one example, the AC energy based segmentation may be implemented as a modification to WebP. Grayscale 512×512 lena512 may be processed using such an implementation as an example for illustration. The image has 1024 macroblocks, and the range of $E_k$, k=0, . . . , 1023, is [0, 7838] in rounded integers. Using K-means partitions the picture into 4 segments, with reduced ranges of $E_k$ (in rounded integers) in each segment as follows:

[2, 130], [131, 377], [384, 744], [761, 1407]

The sizes of the four segments in number of macroblocks are 708, 197, 89, and 30, respectively.

The above K-means method tries to minimize the total squared distance to the segments' centroids. In another example, this method is adjusted by using a different distance measure. For example, if the distance measure is the absolute distance, i.e. the L1 distance, the resulting ranges are:

[2, 46], [46, 161], [164, 419], [419, 1407]

This results in ranges with sizes 526, 219, 175, and 104, respectively.

In order to provide more resolution at the low end, in another example the method uses $\log(E_k)$ instead of $E_k$ in the K-means method. On the same lena512 grayscale image, the K-means method using $\log(E_k)$ and the L1 distance leads to ranges of $E_k$ of:

[2, 14], [14, 49], [49, 176], [178, 1407]

Thus the ranges have sizes 307, 231, 223, and 263, respectively.

Note that in some practical implementations, the centroid calculation might be performed on $E_k$ and the distance calculation might be performed on $\log(E_k)$ to better reflect how these quantities are used in subsequent coding process.

AC Energy-Based Mode Decision

The mode decision in an encoder is often assessed using soft-decision quantization (SDQ) or rate-distortion optimized quantization (RDOQ), techniques that balance quantization distortion with bitrate by minimizing a rate-distortion cost function and, in some cases, a trellis of costs.

When determining a prediction mode, the encoder is often concerned with one block at a time. In JPEG, the block size is 8×8, and in WebP the block size is either 4×4 or 16×16. In (partition) mode decision, the encoder may assess aggregated quality scores of multiple blocks. For example, in WebP to determine whether to use i16 or to use i4 mode, 16 4×4 luminance blocks need to be examined. There are even more candidate partition modes in AVC and HEVC, the latter of which also has a hierarchy of coding tree unit (CTU) sizes ranging from 16×16 to 64×64.

In one aspect of the present application the distortion measurement in determining partition mode may be weighted by a perceptual parameter. The perceptual parameter may be based on the AC energy of the partitioned block. In one example, the perceptual parameter may be based upon a ratio involving the AC energy of the partitioned block and the average AC energy of blocks in the image, picture, segment, slice, etc.

Taking as an example the case where a partition mode needs to be determined for a 16×16 macroblock in WebP, for an image or segment with J macroblocks, and let j denote the index of the current macroblock, j=0, . . . , J−1. For the i16 mode, one can calculate the mean squared distortion $D_{j,i16}$ in the spatial domain between the reconstruction and the original 16×16 block, and record the number of bits $r_{j,i16}$ used to encode the macroblock in this mode. The quantity $D_{j,i16}$ is then weighted by a factor $w_{j,mode}$ determined by the local variance $\sigma_j^2$ in the macroblock and the average variance $\overline{\sigma_{16}^2}$ for all 16×16 macroblocks, i.e., $$w_{j,mode} = \frac{2\overline{\sigma_{16}^2} + C_2}{2\sigma_j^2 + C_2}$$

Similarly for the i4 mode, the encoder may calculate $D_{j,i4}$ and $r_{j,i4}$ for the macroblock where $D_{j,i4}$ is weighted by $w_{j,mode}$ as well. Note that, in this example embodiment, $w_{j,mode}$ is determined from statistics collected in the spatial domain at the macroblock level, and is thus different from the example parameters $w_{i,ac}$ and $w_{i,dc}$ defined in the earlier examples above, which are determined from statistics collected in the transform domain at the (transform) block level. In some embodiments, the encoder may separate $w_{j,mode}$ into $w_{mode,ac}$ and $w_{mode,dc}$ to account for the different contributions of AC and DC components to the visual quality scores. Although, unless the macroblock is dark, the contribution of DC components to the visual quality scores is relatively negligible compared to that of AC components so in some embodiments the single parameter $w_{j,mode}$ may be used without significantly impairing the process.

In contrast to WebP which has only two levels: 4×4 transform block and 16×16 macroblock, HEVC and earlier AVC have a deeper hierarchy. In the case of HEVC, block sizes can range from 4×4 (transform block) to 64×64 (largest coding unit). The above mode decision solution to HEVC involves using different weighing factors, e.g. $w_{j,mode}$, at different levels, i.e. $w_{j,mode}$ for an N×N block may be determined from statistics collected in the spatial domain at the corresponding block level.

SDQ/RDOQ

The use of WMSE (or MSE or other decomposable calculations for distortion) allows for implementation in soft-decision quantization (SDQ) or rate-distortion optimized quantization (RDOQ) techniques. It will be understood that the details of implementations of SDQ and RDOQ are dependent upon the entropy coding process (particularly, on the context model).

A trellis may be used in the implementation of SDQ in some embodiments, as is described in U.S. Pat. No. 8,005,140 to Yang et al., the contents of which are hereby incorporated by reference.

In one aspect, the present application describes a particular trellis structure that may be advantageous in the implementation of SDQ or RDOQ for WebP. Because WebP is closely related to the video coding processes VP8 and VP9, this same trellis structure may be applied in that case.

In WebP, SDQ may be performed for each 4×4 block in the transform domain, in one embodiment. If In WebP, SDQ may be performed for each 4×4 block in the transform domain, in one embodiment. If the DCT coefficients, in scan order, are denoted the DCT coefficients, in scan order, are denoted $y=y_0 \ldots y_{15}$, then a trellis may be used to find the optimal quantization output $u=u_0 \ldots u_{15}$, based on minimization of the expression:

$$\sum_{i=0}^{15} (y_i - \hat{y}_i)^2 + \lambda r(u)$$

In the above expression, $\hat{y}=\hat{y}_0 \ldots \hat{y}_{15}$ denotes the reconstruction of y, and r(u) denotes the number of bits used to encode u by using the entropy coding method defined in WebP. At stage i of a trellis for solving this expression, the number of states is equal to the number K of possible values of $u_i$. Accordingly, the computational complexity grows quadratically with K.

Figure 3:
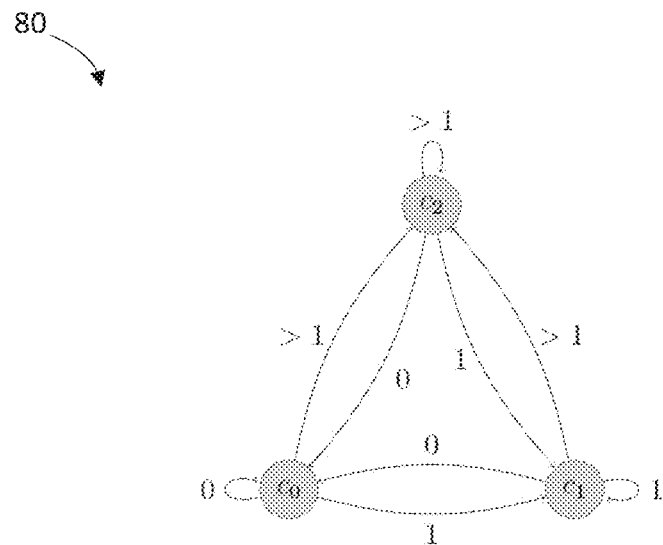
FIG. 3 shows a finite state machine for context determination in WebP coding.
Figure 4:
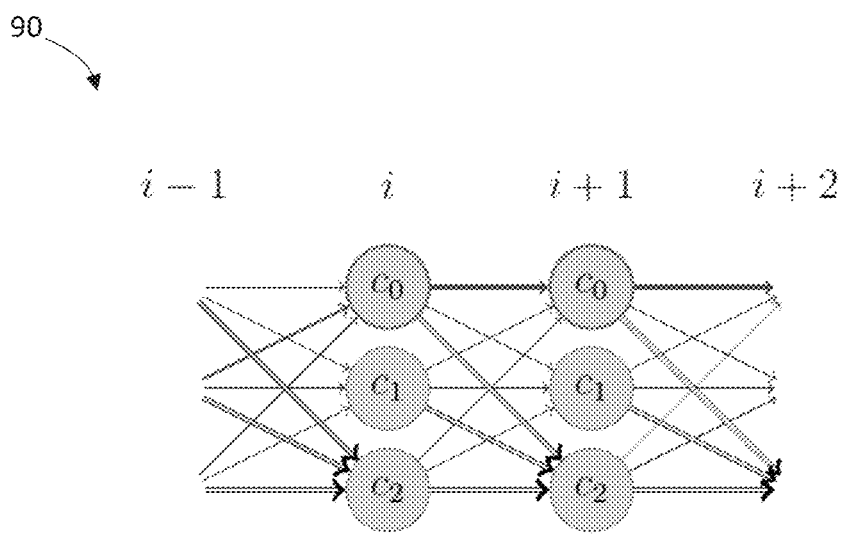
FIG. 4 shows one embodiment of part of an example trellis for soft-decision quantization in WebP.

In one aspect, the present application describes a trellis-based implementation that has a computational complexity that grows linearly with K. An example portion of such a trellis 90 is shown in FIG. 4. Referring also to FIG. 3, the context transitions in WebP are illustrated by a finite state machine 80. The finite state machine 80 for this example context model includes three states: c0, c1, c2.

In WebP, context for $u_i$ is a function of the scan position I and side information, like block types. Specifically, the dependency on $u_{i-1}$ is illustrated by the finite state machine 80 in FIG. 3, where the transition from $c_j$ to $c_k$, j, k=0, 1, 2, depends on the absolute value of $u_{i-1}$.

Because there are only three states, we may construct a trellis that has at most three states at each stage i. Referring to FIG. 4, the trellis 90 has an edge connecting two states at stages i−1 and i, and corresponds to a possible $u_{i-1}$. Note that multiple edges are allowed from $c_k$ at stage i, k=0, 1, 2, to $c_2$ at stage 41. The number of edges is equal to the number K of possible values of $u_i$, but the number of states in each stage is always three in this embodiment. Accordingly, this trellis 90 design may, through use of dynamic programming, be solved with a computational complexity in finding the best path that grow linearly with K.

Quantization Parameter Prediction

As noted above, in some coding processes, it may be desirable to select and/or adjust the quantization step size used for a block of data (or a set of blocks) on the basis of a perceptual visual quality measurement, such as SSIM, or WMSE, or the like. Changes to the mechanisms for predicting quantization parameters may, likewise, be adjusted to account for the use of perceptual visual quality measurements.

In HEVC, as an example, the existing mechanism for determining the quantization step size involves predicting the quantization parameter (Qp) to be used for a quantization group (a quantization group is a group of coding units within a coding tree block that are to be quantized in accordance with the same quantization parameter). This prediction is typically based upon decoded parameters (e.g. decoded coefficients or flags from neighboring blocks or previous quantization groups) and slice-level or picture-level parameters (e.g. a picture-level Qp value). The bitstream includes an encoded difference value that is used by the decoder, in combination with the prediction, to arrive at the actual Qp value to be used for decoding the current quantization group.

To give a specific example, HEVC prescribes the following steps for deriving QpY (the quantization parameter for luma blocks) in connection with a current quantization group:

1. Derive $qP_{Y\_PRED}$ from the decoded neighborhood (blocks left and above), the immediately preceding quantization group (not necessarily adjacent), and the quantization parameters set for the current slice or picture.
2. Parse the quantity CuQpDeltaVal from the bitstream.
3. Derive QpY as:

$$((qP_{Y\_PRED}+CuQpDeltaVal+52+2*QpBdOffset_Y)\%(52+QpBdOffset_Y))-QpBdOffset_Y$$

In the above expression, $QpBdOffset_Y$ specifies the value of the luma quantization parameter range offset and is derived from the bit depth of the picture samples (bit_depth_luma_minus8). In HEVC, bit_depth_luma_minus8 ranges from 0 to 8, which implies a bit depth range of [8, 16], such that the quantity may be given by:

$$QpBdOffset_Y=6*bit\_depth\_luma\_minus8$$

The quantization parameters for the chroma blocks in the same quantization group are then derived from QpY.

Because the neighborhoods (e.g. adjacent blocks to the left and above) to the current quantization group may have substantially different AC energy, if the desired quantization step size for the current quantization group is based on perceptual parameters such as AC energy, it may be quite different from the prediction derived in the typical HEVC prediction process. This results in more significant CuQp-DeltaVal values and consequent inefficiencies in coding those values.

Accordingly, in one aspect, the present application proposes modifications to the prediction process for deriving a quantization parameter. In the description that follows the term block is used generically to refer to a coding block, a group of coding blocks, a quantization group, or other "blocks" to which the present technique could be applied. It will be appreciated that to the extent that the following process is described as applying to a block it may also be applied to a group of blocks, like a quantization group, even if the quantization group is a disjoint, non-square or non-rectangular collection of blocks.

The quantization parameter is not necessarily identical to the quantization step size. There may be a function, f, that maps the quantization parameter, Qp, to a quantization step size, q. Conversely, a function g may denote the inverse of f. In one example, f may be an exponential function, as in AVC and HEVC.

In one illustrative example, $Qp_{Y\_A}$ denotes the quantization parameter of the block (e.g. quantization group) sitting to the left of the current block in the image/slice/picture, and $Qp_{Y\_B}$ denotes the quantization parameter of the block above the current block. In some implementations, if either $Qp_{Y\_A}$ or $Qp_{Y\_B}$ is not available, then it may be set to a default value $Qp_{Y\_PREV}$ which can be the Qp value of the previous quantization group in decoding order, the Qp value of the slice, the Qp value of the picture, or some other Qp value derived from earlier-derived quantization parameters.

As noted above, in order to improve visual quality, as measured by SSIM, the following equality may be considered a goal or target:

$$\frac{q_A^2}{\sigma_A^2} = \frac{q_B^2}{\sigma_B^2}$$

In the above expression, $q_A=f(Qp_{Y\_A})$, $q_B=f(Qp_{Y\_B})$, and $\sigma_A^2$ and $\sigma_B^2$ denote the AC energy of the left group and that of the top group, respectively. Because $\sigma_A^2$ and $\sigma_B^2$ are indicative of AC energy of the pre-quantization coefficients, they are not fully known on the decoder side where only their reconstructions are available. Accordingly, in the present process, the $\sigma_A^2$ and $\sigma_B^2$ values are estimated.

The predicted Qp value, $qP_{Y\_PRED}$, may therefore be obtained in accordance with the expression:

$$qP_{Y\_PRED} = g\left(q_A \frac{\sigma_X}{2\sigma_A} + q_B \frac{\sigma_X}{2\sigma_B}\right)$$

In this expression, $\sigma_X$ is the AC energy of the current group. Naturally, on the decoder side, $\alpha_X$ is not known. Nevertheless, it may be estimated along with $\sigma_A$ and $\sigma_B$.

In one example embodiment, the AC energy of the adjacent groups/blocks is estimated based upon their reconstructions. That is, $\sigma_A$ is the AC energy of the reconstruction of the left group/blocks, and $\sigma_B$ is the AC energy of the reconstruction of the top group/blocks. Of course, the reconstruction of the current block is not available, so its AC energy, $\sigma_X$, is not known at the decoder; however, the prediction of the current block is available. In one embodiment, $\sigma_X$ is estimated based upon the AC energy of the prediction of the current block/group.

In another embodiment, $\sigma_X$ is based upon the AC energy of the prediction of the current block, adjusted based upon the AC energy of residual of either or both of the adjacent groups/blocks. In one example, the AC energy of the residual of an adjacent block is measured as the difference between the AC energy of the reconstruction of the adjacent block and the AC energy of its prediction. For example, if $\sigma_{P,A}$ and $\sigma_{P,B}$ denote the AC energy of the prediction of the left group/blocks and the top group/blocks, respectively, and let $\sigma_{P,X}$ denote the AC energy of the prediction of the current group/blocks. Then, $\sigma_X$ might be estimated as $\sigma_{P,X}+(\sigma_A-\sigma_{P,A})*0.5+(\sigma_B-\sigma_{P,B})*0.5$.

It will be understood that if the adjacent groups/blocks are comprised of a group of blocks, then the AC energy (e.g. $\sigma_A$ and $\sigma_B$) may be calculated as the average AC energy of those blocks in the group, in one embodiment.

In the case where $Qp_{Y\_PREV}$ from a previous quantization group is used in place of $Qp_{Y\_A}$ or $Qp_{Y\_B}$, the corresponding AC energy $\sigma_A$ or $\sigma_B$ may then estimated from the prediction of the previous group. In the case where $Qp_{Y\_PREV}$ is the quantization parameter of the slice (or the picture) and is used in place of $Qp_{Y\_A}$ or $Qp_{Y\_B}$, then corresponding AC energy $\sigma_A$ or $\sigma_B$ may be parsed (as $\bar{\sigma}$) from the slice header along with the slice quantization parameter. In another embodiment, the corresponding AC energy $\sigma_A$ or $\sigma_B$ may be estimated from a previous slice of the same type (I, B, P, etc.). The former solution where $\bar{\sigma}$ is coded in the slice header might be preferred in some applications where dependency on a previous slice/picture is to be avoided. In some example implementations, compensation (made known to the decoder) may be applied to account for the difference between the prediction and the original samples.

Figure 5:
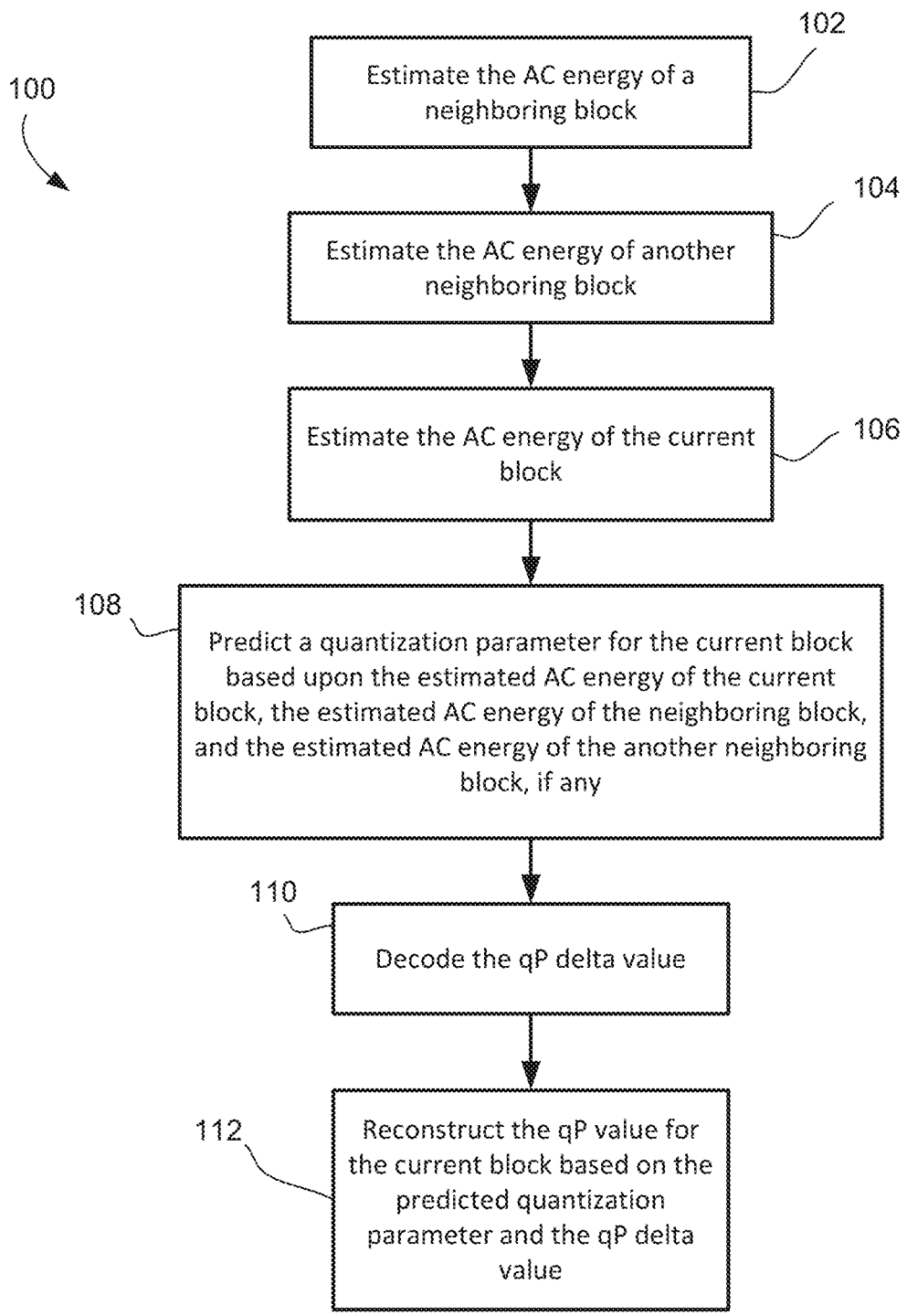
FIG. 5 shows, in flowchart form, a method for reconstructing a quantization parameter for decoding a block of data.

Reference is now made to FIG. 5, which shows one example of a process 100 of reconstructing a quantization parameter for decoding a block of an image (still image or video picture). A block, in this example, may refer to a coding unit or a group of coding units, such as a quantization group, depending on the implementation. Although the below example is described as being implemented at a decoder, it will be appreciated that in some embodiments the process may be implemented at an encoder within the feedback loop for reconstructing blocks for use in predictive operations. To that extent, the reference to a "decoder" includes the decoding process implemented within the feedback loop of an encoder.

In operation 102, the decoder estimates the AC energy of a neighboring block. The neighboring block may be the block above or to the left of the current block in some embodiments. As described above, the estimation of AC energy may be made based on the AC energy of the reconstruction of the neighboring block in some embodiments. In some other embodiments, the estimation may be based on the AC energy of a prediction of the neighboring block. In some cases, a combination of those techniques may be used to derive an estimate of the AC energy of the neighboring block.

In operation 104, the decoder may, in some embodiments, estimate the AC energy of another neighboring block. If the first neighboring block was the block adjacent the current block to the left, then the another block may be the block adjacent and above the current block, in some cases. Conversely, if the first neighboring block was the block adjacent and above the current block to the left, then the another block may be the block adjacent and to the left of the current block, in some cases. In yet other cases, the another block may be in a different location, depending on the block-to-block scan order within the image/picture. In yet a further embodiment, instead of estimating the AC energy of another neighboring block, the decoder may use the estimated AC energy of another quantization group, a slice, a segment, a picture, or another grouping of blocks. For example, the estimated AC energy of the picture or slice may be obtained from the slice/picture header as the quantity $\bar{\sigma}$, in some embodiments. As in operation 102, the estimation of AC energy may be based upon the AC energy of a reconstruction of the another block, or upon the AC energy of a prediction of the another block, for example.

In operation 106, the AC energy of the current block is estimated. As discussed above, the AC energy of the current block may be estimated based upon a prediction of the current block in some embodiments. In yet other embodiments, the AC energy may be based on the estimated AC energy of a reconstruction (which has not yet been created) by estimating the AC energy from the AC energy of the prediction of the current block and the approximate AC energies of the residuals of the neighboring block and the another neighboring block, if any. Other techniques may be used to estimate the AC energy of the current block in other embodiments.

Using these estimated AC energies, the decoder then predicts a quantization parameter for the current block in operation 108. The predicted quantization parameter may be based upon the quantization step size of the neighbouring block and the quantization step size of the another neighbouring block, both weighted by a ratio of the current block's AC energy to their respective AC energies. In one example implementation, the prediction of the quantization parameter may be expressed as:

$$qP_{Y\_PRED} = g\left(q_A \frac{\sigma_X}{2\sigma_A} + q_B \frac{\sigma_X}{2\sigma_B}\right)$$

In operation 110, the decoder decodes the encoded difference value (e.g. CuQpDeltaVal). The difference value is then used together with the predicted quantization parameter to reconstruct the quantization parameter for the current block in operation 112. Having reconstructed the quantization parameter, then decoder may then use the quantization parameter in the decoding and reconstruction of the current block (not illustrated).

In some of the above-described embodiments, all luma blocks in a quantization group share a single quantization parameter $Qp_Y$. In some implementations, one might want to further adjust the quantization parameters for each luma block, for example if the blocks in the group display significant variation in contents (as manifested in AC energy).

As an example illustration, assume that $\sigma_X$ is the parameter used in deriving $Qp_Y$. For example, $\sigma_X$ may be the AC energy of the first luma block of the group whose prediction is known. In another example, $\sigma_X$ may be parsed from the bitstream (as $\bar{\sigma}$ above) for a quantization group. Let $q_X = f(Qp_Y)$, and let $\sigma_c$ be the estimated AC energy of the current block in the group. Note that $\sigma_c$ might be estimated from the prediction of the current block. Then the quantization parameter for the block might be selected as:

$$g\left(q_X \frac{\sigma_c}{\sigma_X}\right)$$

It will be appreciated that some of the above techniques may be applied separately for AC and DC. That is, the quantization parameter used (and predicted) for DC may be separate from the quantization parameter used (and predicted) for AC. In this case, the above techniques can be used to generate a prediction of the quantization parameter for DC of a current block, which is based upon a previous quantization parameter used for DC of a neighboring block, an estimated DC energy of the neighboring block, and an estimated DC energy of the current block, and the prediction of the quantization parameter for AC of a current block, which is based upon a previous quantization parameter used for AC of a neighboring block, an estimated AC energy of the neighboring block, and an estimated AC energy of the current block. Furthermore, separate quantization parameter residuals for DC and AC may be decoded from the bitstream, which together with the predicted quantization parameters for DC and AC, respectively, are used to derive the quantization parameters for DC and AC, respectively, of the current block. Finally, the pixels of the block may be reconstructed by dequantizing decoded quantized DC transform domain coefficient based on the derived quantization parameter for DC, and dequantizing decoded quantized AC transform domain coefficients based on the derived quantization parameter for AC. Note further that in some embodiments, the quantization group for DC might be different from the quantization group for AC for better flexibility and efficiency.

In some coding schemes, the partitioning of the image/picture is complex and involves multiple levels. For example, HEVC provides for multiple block sizes in an attempt to improve coding efficiency. In particular, HEVC uses a coding tree structure, which allows for a larger block to be decomposed into smaller blocks where that make sense from a rate-distortion point-of-view. For example, a 32×32 block might be decomposed into four 16×16 blocks and further into 16 8×8 blocks, etc. To take into account the block sizes in coding quantization parameters, in one embodiment, quantization parameters are grouped according to the block sizes. For example, for each different block size, a parameter $\bar{\sigma}$ may be inserted in the slice/picture header. Similarly, the derivation of $q_X$ and quantization parameters in a quantization group above might be done separately for different block sizes. Finally, $\sigma_A$, $\sigma_B$, $\sigma_X$, and $\sigma_c$ may be normalized against the associated block sizes in cases where blocks of different sizes are to be considered together.

Figure 6:
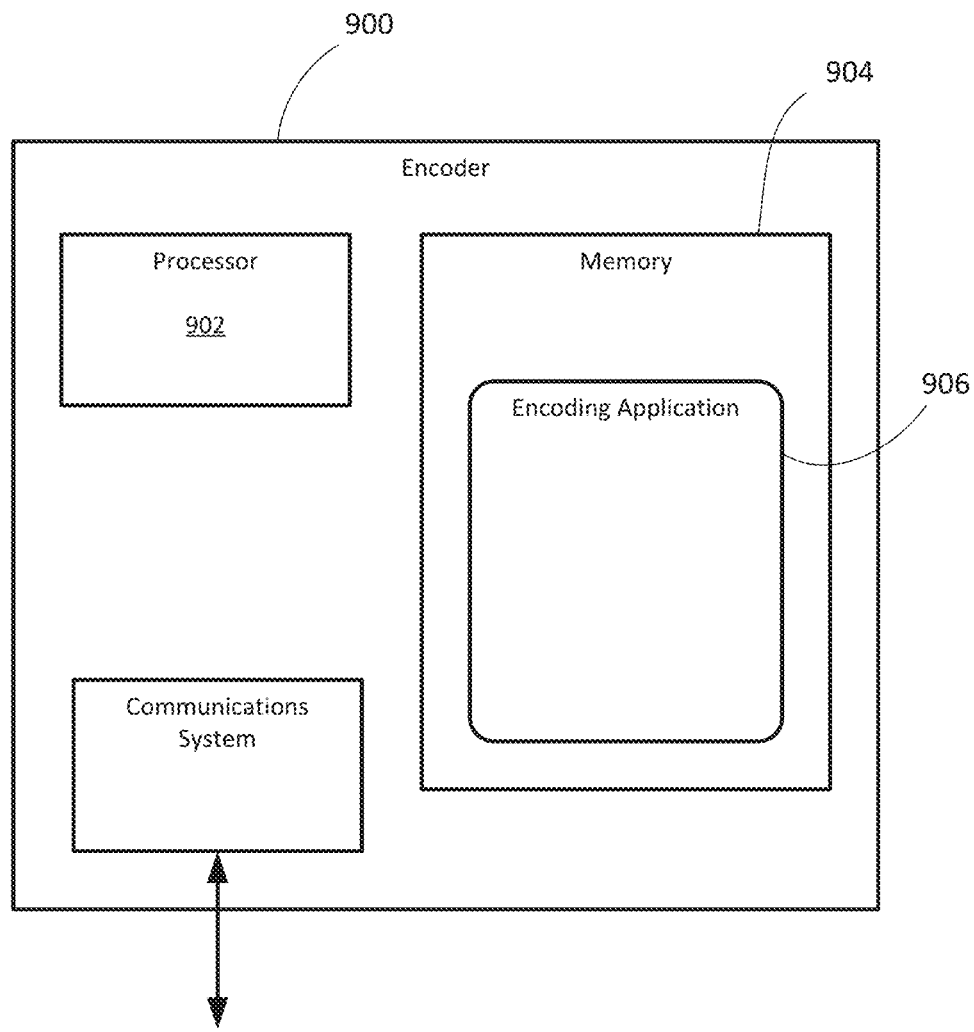
FIG. 6 shows a simplified block diagram of an example embodiment of an encoder.

Reference is now made to FIG. 6, which shows a simplified block diagram of an example embodiment of an encoder 900. The encoder 900 includes a processor 902, memory 904, and an encoding application 906. The encoding application 906 may include a computer program or application stored in memory 904 and containing instructions for configuring the processor 902 to perform operations such as those described herein. For example, the encoding application 906 may encode and output bitstreams encoded in accordance with the processes described herein. It will be understood that the encoding application 906 may be stored in on a computer-readable medium, such as a compact disc, flash memory device, random access memory, hard drive, etc.

Figure 7:
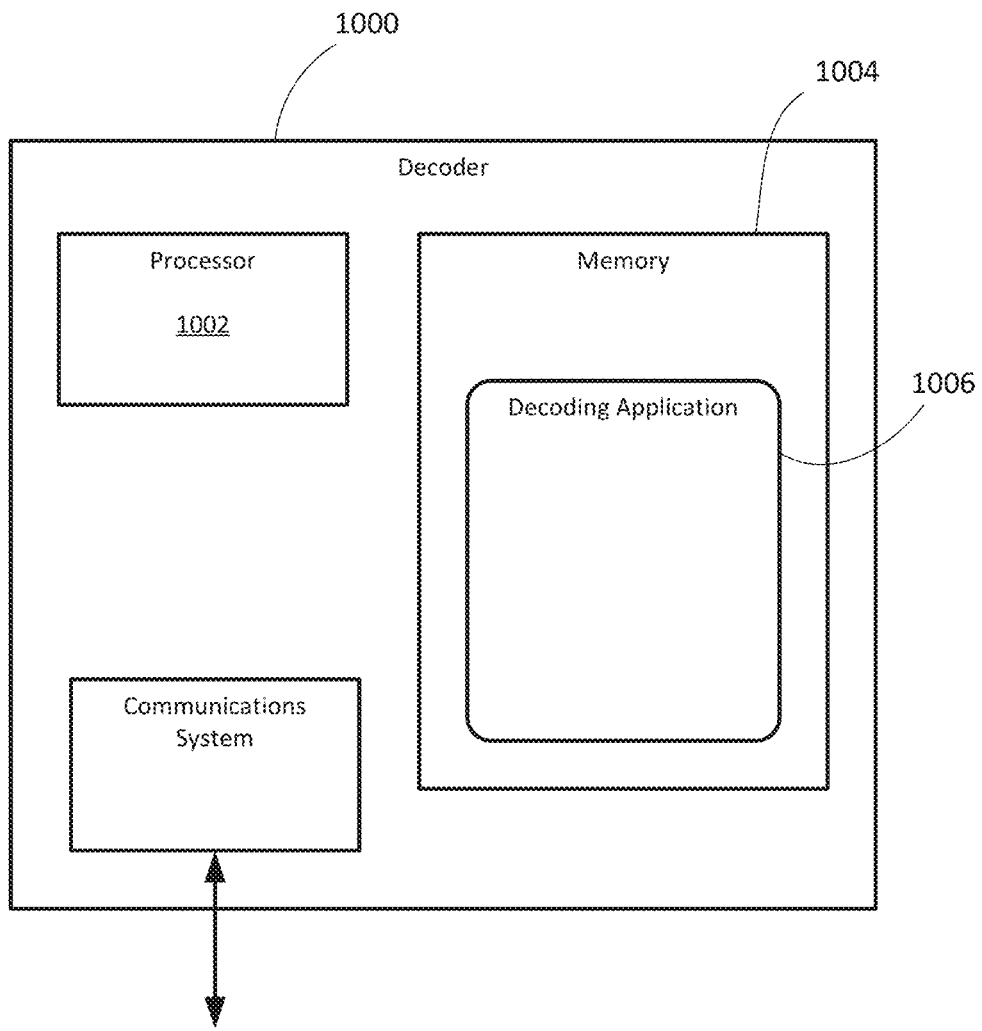
FIG. 7 shows a simplified block diagram of an example embodiment of a decoder.

Reference is now also made to FIG. 7, which shows a simplified block diagram of an example embodiment of a decoder 1000. The decoder 1000 includes a processor 1002, a memory 1004, and a decoding application 1006. The decoding application 1006 may include a computer program or application stored in memory 1004 and containing instructions for configuring the processor 1002 to perform operations such as those described herein. It will be understood that the decoding application 1006 may be stored in on a computer-readable medium, such as a compact disc, flash memory device, random access memory, hard drive, etc.

It will be appreciated that the decoder and/or encoder according to the present application may be implemented in a number of computing devices, including, without limitation, servers, suitably-programmed general purpose computers, audio/video encoding and playback devices, set-top television boxes, television broadcast equipment, and mobile devices. The decoder or encoder may be implemented by way of software containing instructions for configuring a processor or processors to carry out the functions described herein. The software instructions may be stored on any suitable non-transitory computer-readable memory, including CDs, RAM, ROM, Flash memory, etc.

It will be understood that the encoder described herein and the module, routine, process, thread, or other software component implementing the described method/process for configuring the encoder may be realized using standard computer programming techniques and languages. The present application is not limited to particular processors, computer languages, computer programming conventions, data structures, other such implementation details. Those skilled in the art will recognize that the described processes may be implemented as a part of computer-executable code stored in volatile or non-volatile memory, as part of an application-specific integrated chip (ASIC), etc.

Certain adaptations and modifications of the described embodiments can be made. Therefore, the above discussed embodiments are considered to be illustrative and not restrictive.

What is claimed is:

1. A method of decoding an image from a bitstream of encoded data using a decoder, the image being partitioned into blocks, the method comprising:
for a current block of the image,
determining a predicted value of a quantization parameter to be used in decoding the current block, wherein the predicted value is based upon
a previous quantization parameter used for a neighboring block in the image,
an estimated AC energy of the neighboring block, and
an estimated AC energy of the current block;
decoding from the bitstream a quantization parameter residual and deriving the quantization parameter from the predicted value and the quantization parameter residual; and reconstructing the pixels of the block, including dequantizing decoded quantized transform domain coefficients based on the quantization parameter.

2. The method claimed in claim 1, wherein the predicted value is further based upon a second previous quantization parameter used for another neighboring block in the image.

3. The method claimed in claim 2, wherein the neighboring block and the another neighboring block comprise the block to the left of the current block in the image and the block above the current block in the image.

4. The method claimed in claim 1, wherein the predicted value is further based upon a second previous quantization parameter used for a previous quantization group in decoding order or obtained from header information for the image.

5. The method claimed in claim 1, wherein the quantization parameter comprises one of a plurality of defined QP values, and wherein dequantizing decoded quantized transform domain coefficients based on the quantization parameter identifying a quantization step size corresponding to that QP value and using that quantization step size in the dequantization.

6. The method claimed in claim 1, wherein the estimated AC energy of the neighboring block comprises the AC energy of a prediction of the neighboring block, and wherein the estimated AC energy of the current block comprises the AC energy of a prediction of the current block.

7. The method claimed in claim 1, wherein the estimated AC energy of the neighboring block comprises the AC energy of a reconstruction of the neighboring block, and wherein the estimated AC energy of the current block is estimated based upon:
   the AC energy of a prediction of the current block, and
   a difference between the AC energy of the reconstruction of the neighboring block and the AC energy of a prediction of the neighboring block.

8. The method claimed in claim 1, wherein each block comprises one of a coding unit, a group of coding units, and a quantization group containing multiple coding units.

9. A decoder for decoding an image from a bitstream of encoded data, the image being partitioned into blocks, the decoder comprising:
   a processor;
   a memory; and
   a decoding application stored in memory and containing instructions executable by the processor to
   for a current block of the image,
      determine a predicted value of a quantization parameter to be used in decoding the current block, wherein the predicted value is based upon
         a previous quantization parameter used for a neighboring block in the image,
         an estimated AC energy of the neighboring block, and
         an estimated AC energy of the current block,
      decode from the bitstream a quantization parameter residual and derive the quantization parameter from the predicted value and the quantization parameter residual, and
      reconstruct the pixels of the block by dequantizing decoded quantized transform domain coefficients based on the quantization parameter.

10. The decoder claimed in claim 9, wherein the predicted value is further based upon a second previous quantization parameter used for another neighboring block in the image.

11. The decoder claimed in claim 10, wherein the neighboring block and the another neighboring block comprise the block to the left of the current block in the image and the block above the current block in the image.

12. The decoder claimed in claim 9, wherein the predicted value is further based upon a second previous quantization parameter used for a previous quantization group in decoding order or obtained from header information for the image.

13. The decoder claimed in claim 9, wherein the quantization parameter comprises one of a plurality of defined QP values, and wherein the processor is to dequantize decoded quantized transform domain coefficients based on the quantization parameter identifying a quantization step size corresponding to that QP value and using that quantization step size in the dequantization.

14. The decoder claimed in claim 9, wherein the estimated AC energy of the neighboring block comprises the AC energy of a prediction of the neighboring block, and wherein the estimated AC energy of the current block comprises the AC energy of a prediction of the current block.

15. The decoder claimed in claim 9, wherein the estimated AC energy of the neighboring block comprises the AC energy of a reconstruction of the neighboring block, and wherein the estimated AC energy of the current block is estimated based upon:
   the AC energy of a prediction of the current block, and
   a difference between the AC energy of the reconstruction of the neighboring block and the AC energy of a prediction of the neighboring block.

16. The decoder claimed in claim 9, wherein each block comprises one of a coding unit, a group of coding units, and a quantization group containing multiple coding units.

17. A non-transitory processor-readable medium storing processor-executable instructions for decoding an image from a bitstream of encoded data using a decoder, the image being partitioned into blocks, wherein the processor-executable instructions comprise:
   for a current block of the image,
      instructions to determine a predicted value of a quantization parameter to be used in decoding the current block, wherein the predicted value is based upon
         a previous quantization parameter used for a neighboring block in the image,
         an estimated AC energy of the neighboring block, and
         an estimated AC energy of the current block;
      instructions to decode from the bitstream a quantization parameter residual and derive the quantization parameter from the predicted value and the quantization parameter residual; and
      instructions to reconstruct the pixels of the block, including dequantizing decoded quantized transform domain coefficients based on the quantization parameter.

18. The non-transitory processor-readable medium claimed in claim 17, wherein the predicted value is further based upon a second previous quantization parameter used for another neighboring block in the image.

19. The non-transitory processor-readable medium claimed in claim 18, wherein the neighboring block and the another neighboring block comprise the block to the left of the current block in the image and the block above the current block in the image.

20. The non-transitory processor-readable medium claimed in claim 17, wherein the estimated AC energy of the neighboring block comprises the AC energy of a prediction of the neighboring block, and wherein the estimated AC energy of the current block comprises the AC energy of a prediction of the current block.

\* \* \* \* \*